US009560564B2

(12) United States Patent
Thota et al.

(10) Patent No.: US 9,560,564 B2
(45) Date of Patent: *Jan. 31, 2017

(54) ASSISTING RETURN TO A FIRST NETWORK FROM A SECOND NETWORK AFTER PERFORMANCE OF A CIRCUIT SWITCHED FALLBACK PROCEDURE

(71) Applicant: Apple Inc., Cupertino, CA (US)

(72) Inventors: Mohan Rao Thota, Sunnyvale, CA (US); Sai Sravan Bharadwaj Karri, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,247

(22) Filed: Jun. 8, 2015

(65) Prior Publication Data

US 2015/0350984 A1   Dec. 3, 2015

Related U.S. Application Data

(63) Continuation of application No. 13/783,075, filed on Mar. 1, 2013, now Pat. No. 9,055,488.

(51) Int. Cl.
| | |
|---|---|
| *H04L 12/26* | (2006.01) |
| *H04W 36/14* | (2009.01) |
| *H04W 24/08* | (2009.01) |
| *H04W 36/00* | (2009.01) |
| *H04W 84/04* | (2009.01) |

(52) U.S. Cl.
CPC ............. *H04W 36/14* (2013.01); *H04W 24/08* (2013.01); *H04W 36/0022* (2013.01); *H04W 84/042* (2013.01)

(58) Field of Classification Search
CPC ....... H04W 24/00; H04W 36/00; H04W 36/02
USPC .......................................................... 370/252
See application file for complete search history.

(56) References Cited

U.S. PATENT DOCUMENTS

| 8,054,836 | B2 | 11/2011 | Fischer |
| 8,175,059 | B2 | 5/2012 | Veres |
| 8,228,869 | B2 | 7/2012 | Ahluwalia |
| 9,055,488 | B2* | 6/2015 | Thota ................ H04W 36/0022 |
| 2011/0261790 | A1* | 10/2011 | Gazzard .................. H04L 47/10 |
| | | | 370/332 |
| 2012/0182912 | A1 | 7/2012 | Watfa et al. |
| 2012/0281566 | A1 | 11/2012 | Pelletier et al. |

(Continued)

*Primary Examiner* — Afshawn Towfight
(74) *Attorney, Agent, or Firm* — Downey Brand LLP

(57) ABSTRACT

A method for assisting a wireless communication device to return to a first network from a second network is provided. The method can include the wireless communication device participating in a CSFB procedure to transition from the first network to the second network for servicing of a voice call; receiving a connection release from the second network after termination of the voice call; initiating a reselection procedure to reselect to the first network; determining presence of packet switched data ready for transmission from the wireless communication device before completion of the reselection procedure; holding the packet switched data at the wireless communication device at least until expiry of a reselection timer initiated during the reselection procedure; reselecting to the first network after expiry of the reselection timer; and initiating transmission of the packet switched data on the first network after completing reselection to the first network.

20 Claims, 9 Drawing Sheets

(56) References Cited

U.S. PATENT DOCUMENTS

2013/0070728 A1* 3/2013 Umatt ............... H04W 36/0022
370/331

* cited by examiner

ASSISTING RETURN TO A FIRST NETWORK FROM A SECOND NETWORK AFTER PERFORMANCE OF A CIRCUIT SWITCHED FALLBACK PROCEDURE

CROSS-REFERENCE TO RELATED APPLICATIONS

This application is a continuation of U.S. patent application Ser. No. 13/783,075, filed on Mar. 1, 2013, the disclosure of which is incorporated herein by reference in its entirety.

FIELD OF THE DESCRIBED EMBODIMENTS

The described embodiments relate generally to wireless communications and more particularly to assisting return to a first network from a second network after performance of a circuit switched fallback (CSFB) procedure.

BACKGROUND

Cellular networks using newer radio access technology (RAT) systems, such as Long Term Evolution (LTE) systems, are being developed and deployed. Networks using these newer RATs often support faster data rates than networks utilizing legacy RATs, such as second generation (2G) and third generation (3G) RATs, including Universal Mobile Telecommunications System (UMTS) networks and Global System for Mobile Communications (GSM) networks. However, in some deployments, LTE and other new RATs may not fully support some services that can be handled by legacy networks. Accordingly, LTE networks are often co-deployed in overlapping regions with legacy networks and wireless communication devices may transition between RATs as services or coverage may require. For example, in some deployments, LTE networks are not capable of supporting voice calls. Accordingly, when a wireless communication device receives or initiates a voice call while connected to a network that supports data sessions, but not voice calls, the wireless communication device can perform a circuit switched fallback (CSFB) procedure to transition to a legacy network that supports voice calls.

In some instances, there may be a significant amount of background data traffic on a wireless communication device, including, for example, email, a data service for keeping a device connected to servers, and/or the like. Since newer networks, such as LTE, can offer faster data rates than legacy networks, devices enabled to operate on LTE networks generally prefer to stay on LTE when LTE access is available for both idle state and active data transmission state. In this regard, LTE can offer a better user experience than legacy networks due to its higher data rates. Under the CSFB scheme, LTE will only provide the data service, while legacy networks will provide both voice and data service. Due to the nature of smart phones and other wireless communication devices, data traffic can be serviced at the same time with the voice call on a legacy network. However, even after the voice call has terminated, a wireless communication device can sometimes be inhibited from returning to LTE due to underlying data traffic activities, as a device can need idle time to do system re-selection in order for it to return to LTE. Even when a wireless communication device has idle time to complete a reselection to LTE, data packets can often arrive at a baseband layer of the device from higher layers for transmission to the network, and the device can abort the reselection procedure and remain on the legacy network to transmit the data. In this regard, current wireless communication devices can discard timers tied to cell reselection and remain on a legacy network in response to data packets arriving at the baseband layer for transmission before a reselection procedure has been completed. The reselection procedure can then be restarted after completion of the data transfer. As such, even though wireless communication devices generally prefer to operate on LTE networks when available unless servicing an active voice call in order to provide better user experience, a device can often be stuck on a legacy network even after termination of a voice call if there is an active data transfer, or if data packets become ready for transmission before reselection is completed. Users can accordingly experience less than desirable data performance for significant time periods following voice call termination even when access to a network offering faster data rates is available.

SUMMARY OF THE DESCRIBED EMBODIMENTS

Some example embodiments disclosed herein provide for assisting return to a first network from a second network after performance of a CSFB procedure. In this regard, a wireless communication device in accordance with some example embodiments can be configured, in the event that packet switched data is ready for transmission from the device prior to completion of a reselection procedure, to hold the packet switched data at least until expiry of a reselection timer that can be initiated during the reselection procedure. Holding the packet switched data in accordance with such example embodiments can allow for completion of the reselection procedure so that transmission of the packet switched data can be initiated on the first network after reselection has been completed. In embodiments in which the first network can offer faster data rates than the second network, such as in embodiments in which the first network is an LTE network and the second network is a legacy network, user experience can accordingly be improved, as allowing for completion of the reselection procedure before initiating the data transfer can provide faster data rates for the data. In most instances, the time for which the packet switched data can be held to allow for completion of the reselection procedure before initiating data transmission can be insignificant in comparison to the reduction in the amount of time that it can take to transfer the data on the first network versus the second network. As such, user experience can be noticeably improved in spite of the delay in initiating data transmission in most instances.

In a first embodiment, a method for assisting a wireless communication device to return to an LTE network from a legacy network is provided. The method of the first embodiment can include the wireless communication device participating in a CSFB procedure to transition the wireless communication device from the LTE network to a legacy network for servicing of a voice call. The legacy network can have a circuit switched domain and the voice call can be handled by the circuit switched domain of the legacy network. The method of the first embodiment can further include the wireless communication device receiving a connection release from the legacy network after termination of the voice call; initiating a reselection procedure to reselect to the LTE network; determining presence of packet switched data ready for transmission from the wireless communication device before completion of the reselection procedure; holding the packet switched data at the wireless communication device at least until expiry of a reselection timer initiated during the reselection procedure; reselecting to the LTE network after expiry of the reselection timer; and initiating transmission of the packet switched data on the LTE network after completing reselection to the LTE network.

In a second embodiment, a method for assisting a wireless communication device to return to a first network from a second network is provided. The method of the second embodiment can include the wireless communication device participating in a CSFB procedure to transition the wireless communication device from the first network to the second network for servicing of a voice call; receiving a connection release from the second network after termination of the voice call; initiating a reselection procedure to reselect to the first network; determining presence of packet switched data ready for transmission from the wireless communication device before completion of the reselection procedure; holding the packet switched data at the wireless communication device at least until expiry of a reselection timer initiated during the reselection procedure; reselecting to the first network after expiry of the reselection timer; and initiating transmission of the packet switched data on the first network after completing reselection to the first network.

In a third embodiment, a wireless communication device is provided. The wireless communication device of the second embodiment can include at least one transceiver and processing circuitry coupled to the at least one transceiver. The at least one transceiver can be configured to transmit data to and receive data from a first network and a second network. The processing circuitry can be configured to control the wireless communication device to at least participate in a CSFB procedure to transition from the first network to the second network in response to initiation of a voice call; receive a connection release from the second network after termination of the voice call; initiate a reselection procedure to reselect to the first network; determine presence of packet switched data ready for transmission from the wireless communication device before completion of the reselection procedure; hold the packet switched data at the wireless communication device at least until expiry of a reselection timer initiated during the reselection procedure; reselect to the first network after expiry of the reselection timer; and initiate transmission of the packet switched data on the first network after completing reselection to the first network.

In a fourth embodiment, a computer program product for assisting a wireless communication device to return to a first network from a second network is provided. The computer program product of the fourth embodiment can include at least one non-transitory computer readable storage medium having program code stored thereon. The program code can include program code for participating in a CSFB procedure to transition the wireless communication device from the first network to the second network for servicing of a voice call; program code for receiving a connection release from the second network after termination of the voice call; program code for initiating a reselection procedure to reselect to the first network; program code for determining presence of packet switched data ready for transmission from the wireless communication device before completion of the reselection procedure; program code for holding the packet switched data at the wireless communication device at least until expiry of a reselection timer initiated during the reselection procedure; program code for reselecting to the first network after expiry of the reselection timer; and program code for initiating transmission of the packet switched data on the first network after completing reselection to the first network.

In a fifth embodiment, an apparatus for assisting a wireless communication device to return to a first network from a second network is provided. The apparatus of the fifth embodiment can include means for participating in a Circuit Switched Fallback (CSFB) procedure to transition the wireless communication device from the first network to the second network for servicing of a voice call; means for receiving a connection release from the second network after termination of the voice call; means for initiating a reselection procedure to reselect to the first network; means for determining presence of packet switched data ready for transmission from the wireless communication device before completion of the reselection procedure; means for holding the packet switched data at the wireless communication device at least until expiry of a reselection timer initiated during the reselection procedure; means for reselecting to the first network after expiry of the reselection timer; and means for initiating transmission of the packet switched data on the first network after completing reselection to the first network.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. Other embodiments, aspects, and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
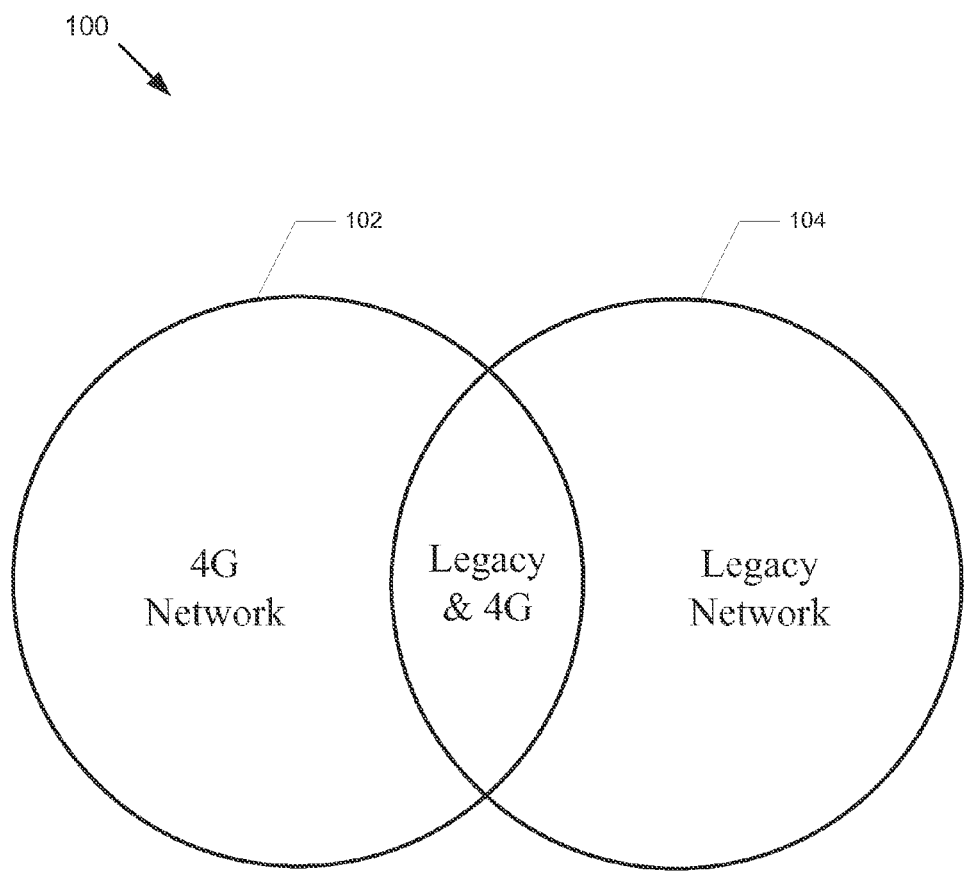
FIG. 1 illustrates overlapping coverage of a fourth generation network and a legacy network in accordance with some example embodiments.

Representative applications of methods and apparatus according to the present specification are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Some example embodiments disclosed herein provide for assisting return to a first network from a second network after performance of a CSFB procedure. In this regard, some example embodiments address a situation in which packet switched data can become ready for transmission from a wireless communication device before the device has completed a reselection procedure for reselecting to the first network. More particularly, a wireless communication device in accordance with some example embodiments can be configured, in the event that packet switched data is ready for transmission from the device prior to completion of a reselection procedure, to hold the packet switched data at least until expiry of a reselection timer that can be initiated during the reselection procedure. Holding the packet switched data in accordance with such example embodiments can allow for completion of the reselection procedure so that transmission of the packet switched data can be initiated on the first network after reselection has been completed.

In embodiments in which the first network can offer faster data rates than the second network, such as in embodiments in which the first network is an LTE network and the second network is a legacy network, user experience can accordingly be improved, as allowing for completion of the reselection procedure before initiating the data transfer can provide faster data rates for the data transfer. In most instances, the time for which the packet switched data can be held to allow for completion of the reselection procedure before initiating data transmission can be insignificant in comparison to the reduction in the amount of time that it can take to transfer the data on the first network versus the second network. As such, user experience can be noticeably improved in spite of the delay in initiating data transmission in most instances.

FIG. 1 illustrates overlapping coverage of a fourth generation (4G) network 102 and a legacy network 104 in a communications system 100 in accordance with some example embodiments. The 4G network 102 can, for example, be a network using an LTE technology, such as an LTE network or LTE-Advanced (LTE-A) network, or other network that can offer faster data rates than legacy networks, such as second generation (2G) and third generation (3G) networks, but may not support voice calls. It will be appreciated that the 4G network is illustrated by way of example, and not by way of limitation. In this regard, other networks in existence now or that may be developed in the future that can offer higher data rates than legacy networks, but which do not support circuit switched (CS) voice calls can be substituted for the 4G network 102 within the scope of the disclosure. The legacy network 104 can be any legacy network having a CS domain to support CS voice calls. By way of non-limiting example, the legacy network 104 can be a 3G network, such as a Wideband Code Division Multiple Access (WCDMA) or other Universal Mobile Telecommunications System (UMTS) network, such as a Time Division Synchronous Code Division Multiple Access (TD-SCDMA) network. As a further example, the legacy network 104 can be a CDMA2000 network, such as a 1×RTT network, or other network standardized by the Third Generation Partnership Project 2 (3GPP2) that supports a CS domain. As another example, the legacy network can be a 2G network such as a Global System for Mobile Communications (GSM) network.

The 4G network 102 and legacy network 104 can each have regions of coverage represented by the respective circles illustrated in FIG. 1. The regions of coverage can overlap, such as illustrated by the overlapping portions of the circles in FIG. 1. A wireless communication device in accordance with some example embodiments can operate on both the 4G network 102 and the legacy network 104. Thus, for example, when the wireless communication device is in a region of overlapping coverage, the wireless communication device can be connected to the 4G network 102 with an ongoing data session and can perform a CSFB procedure to the legacy network 104 in response to initiation of a voice call.

Figure 2:
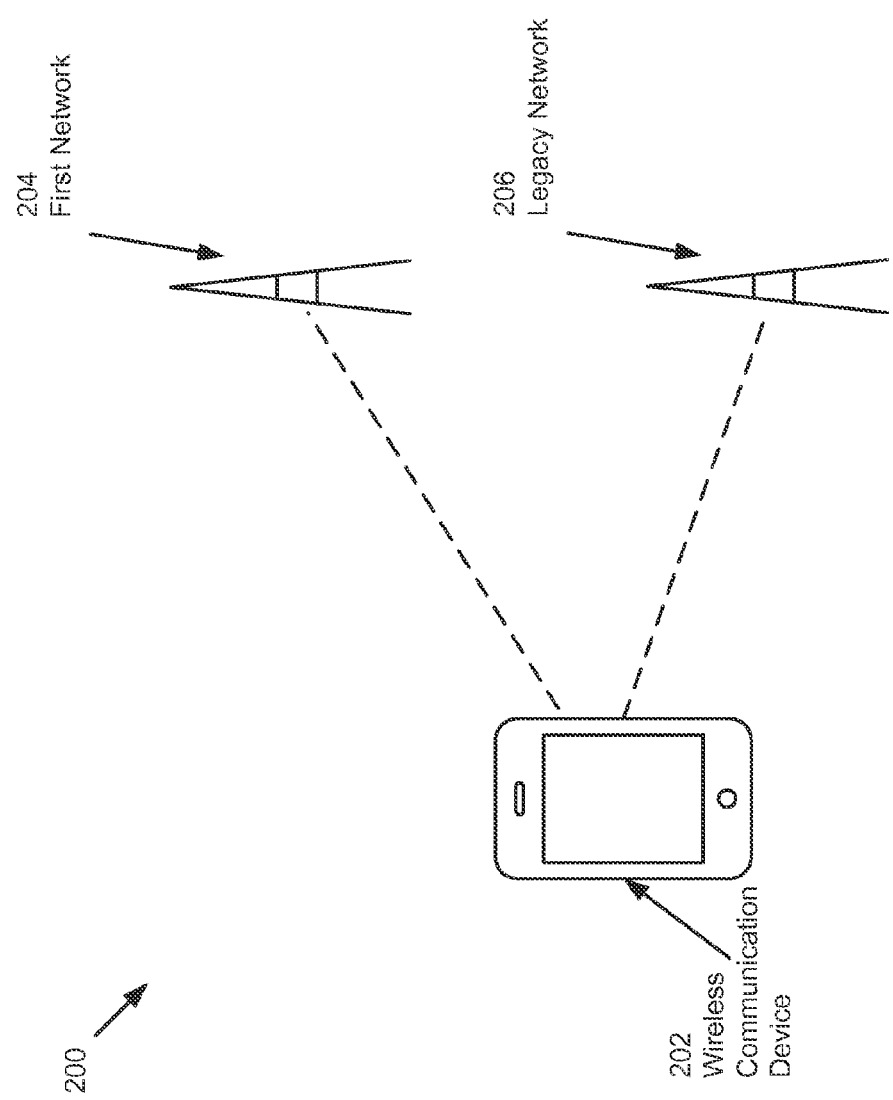
FIG. 2 illustrates an example system having multiple wireless communication networks to which a wireless communication device can connect in accordance with some example embodiments.

FIG. 2 illustrates an example system 200 having multiple wireless communication networks to which a wireless communication device 202 can connect in accordance with some example embodiments. By way of non-limiting example, the wireless communication device 202 can be a cellular phone, such as a smart phone device; a tablet computing device; a laptop computing device; or other computing device configured to operate within both a first network 204 and a legacy network 206. The first network 204 can be any network supporting packet switched (PS) data sessions, but which does not have a CS domain for supporting CS voice calls. In some example embodiments, the first network 204 can offer higher theoretical data rates than the legacy network 206. Thus, for example, the first network 204 can be a network using an LTE technology (e.g., an LTE network, LTE-A network, or using another present or future developed LTE technology) or other 4G network, such as the 4G network 102 illustrated in FIG. 1. The legacy network 206 can be any network having a CS domain to support CS voice calls. By way of non-limiting example, the legacy network 206 can be a UMTS network, a 3GPP2 network, or other 3G network. As a further example, the legacy network 206 can be a GSM or other 2G network, or other legacy network that can support CS voice calls. In this regard, the legacy network 206 can be the legacy network 104.

As illustrated in FIG. 2, the wireless communication device 202 can be within signaling range of both a base station or other access point for the first network 204 and a base station or other access point for the legacy network 206. In this regard, the wireless communication device 202 can be located in a region of overlapping coverage of the first network 204 and the legacy network 206. As such, the wireless communication device 202 can connect to the first network 204. In response to initiation of a CS voice call (e.g., a mobile originating voice call initiated by the wireless communication device 202 or a mobile terminating voice call placed to the wireless communication device 202), the wireless communication device 202 can participate in a CSFB procedure to transition from the first network 204 to the legacy network 206 so that the voice call can be supported. The CSFB procedure can, for example, be performed as defined in TS 23.272, the contents of which are incorporated herein by reference in its entirety.

Figure 3:
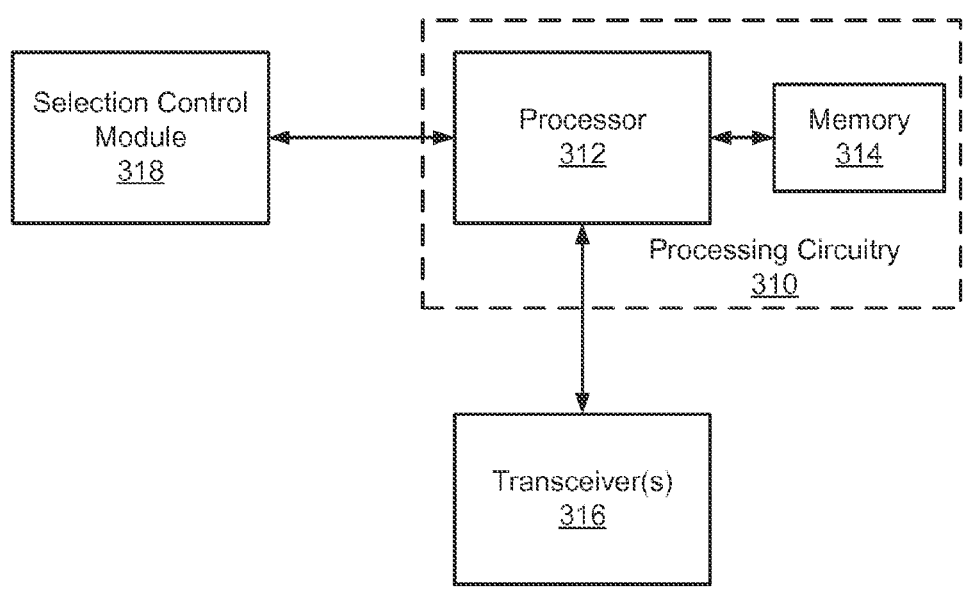
FIG. 3 illustrates a block diagram of an apparatus that can be implemented on a wireless communication device in accordance with some example embodiments.

FIG. 3 illustrates a block diagram of an apparatus 300 that can be implemented on a wireless communication device 202 in accordance with some example embodiments. In this regard, when implemented on a computing device, such as wireless communication device 202, apparatus 300 can enable the computing device to operate within the system 200 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of the apparatus 300 in accordance with various example embodiments, and thus can provide means for performing functionalities of the apparatus 300 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a chipset(s). In some example embodiments in which one or more components of the apparatus 300 are embodied as a chipset, the chipset can be capable of enabling a computing device to operate in the system 200 when implemented on or otherwise operably coupled to the computing device. Thus, for example, one or more components of the apparatus 300 can provide a chipset configured to enable a computing device to operate over the first network 204 and/or the legacy network 206. In some example embodiments, one or more components of he apparatus 300 can provide a cellular baseband chipset, which can enable a computing device to operate over the first network 204 and/or the legacy network 206.

In some example embodiments, the processing circuitry 310 can include a processor 312 and, in some embodiments, such as that illustrated in FIG. 3, can further include memory 314. The processing circuitry 310 can be in communication with or otherwise control a transceiver(s) 316 and/or selection control module 318.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of the apparatus 300 as described herein. In some example embodiments, the processor 312 can be configured to execute instructions that can be stored in the memory 314 or that can be otherwise accessible to the processor 312. As such, whether configured by hardware or by a combination of hardware and software, the processor 312 can be capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver(s) 316, or selection control module 318 via a bus(es) for passing information among components of the apparatus 300.

The apparatus 300 can further include transceiver(s) 316. The transceiver(s) 316 can enable the apparatus 300 to send wireless signals to and receive signals from one or more wireless networks, such as the first network 204 and the legacy network 206. As such, the transceiver(s) 316 can be configured to support any type of cellular or other wireless communication technology that may be implemented by the first network 204 and/or legacy network 206. In some example embodiments, the transceiver(s) 316 can include a single transceiver configured to enable the wireless communication device 202 to connect to both the first network 204 and the legacy network 206. Alternatively, in some example embodiments, the transceiver(s) 316 can include a first transceiver configured to enable the wireless communication device 202 to connect to the first network 204 and a second transceiver configured to enable the wireless communication device 202 to connect to the legacy network 206.

The apparatus 300 can further include selection control module 318. The selection control module 318 can be embodied as various means, such as circuitry, hardware, a computer program product comprising a computer readable medium (for example, the memory 314) storing computer readable program instructions executable by a processing device (for example, the processor 312), or some combination thereof. In some embodiments, the processor 312 (or the processing circuitry 310) can include, or otherwise control the selection control module 318.

The selection control module 318 can be configured in some example embodiments to control performance of a reselection procedure to reselect to the first network 204 from the legacy network 206 after termination of a voice call for which a CSFB procedure had been performed to transition the wireless communication device 202 from the first network 204 to the legacy network 206. In some example embodiments, the selection control module 318 can be configured to initiate the reselection procedure after receiving a connection release from the legacy network 206. After receiving the connection release, the wireless communication device 202 can be in a radio resource control (RRC) state other than cell dedicated channel (CELL_DCH) state, such as cell forward access channel (CELL_FACH) state, cell paging channel (CELL_PCH) state, Universal Terrestrial Access Network (UTRA) registration area paging channel (URA_PCH) state, idle state, or other state, which can allow the wireless communication device 202 to reselect to the first network 204.

The selection control module 318 of some example embodiments can be configured to determine presence of packet switched (PS) data ready for transmission from the wireless communication device 202 before completion of the reselection procedure. For example, packet switched data can arrive at a cellular baseband layer from a layer higher than the cellular baseband layer, such as, by way of non-limiting example, an application layer during the reselection procedure. Rather than aborting the reselection procedure and initiating transmission of the packet switched data on the legacy network 104 in response to the presence of the packet switched data, the selection control module 318 of such example embodiments can be configured to hold the packet switched data at the wireless communication device 202 at least until expiry of a reselection timer that can be initiated attendant to performance of the reselection procedure. In this regard, holding the packet switched data t least until expiry of the reselection timer can allow for completion of the reselection procedure so that transmission of the packet switched data can be initiated on the first network 204 rather than on the legacy network 206.

Figure 4:
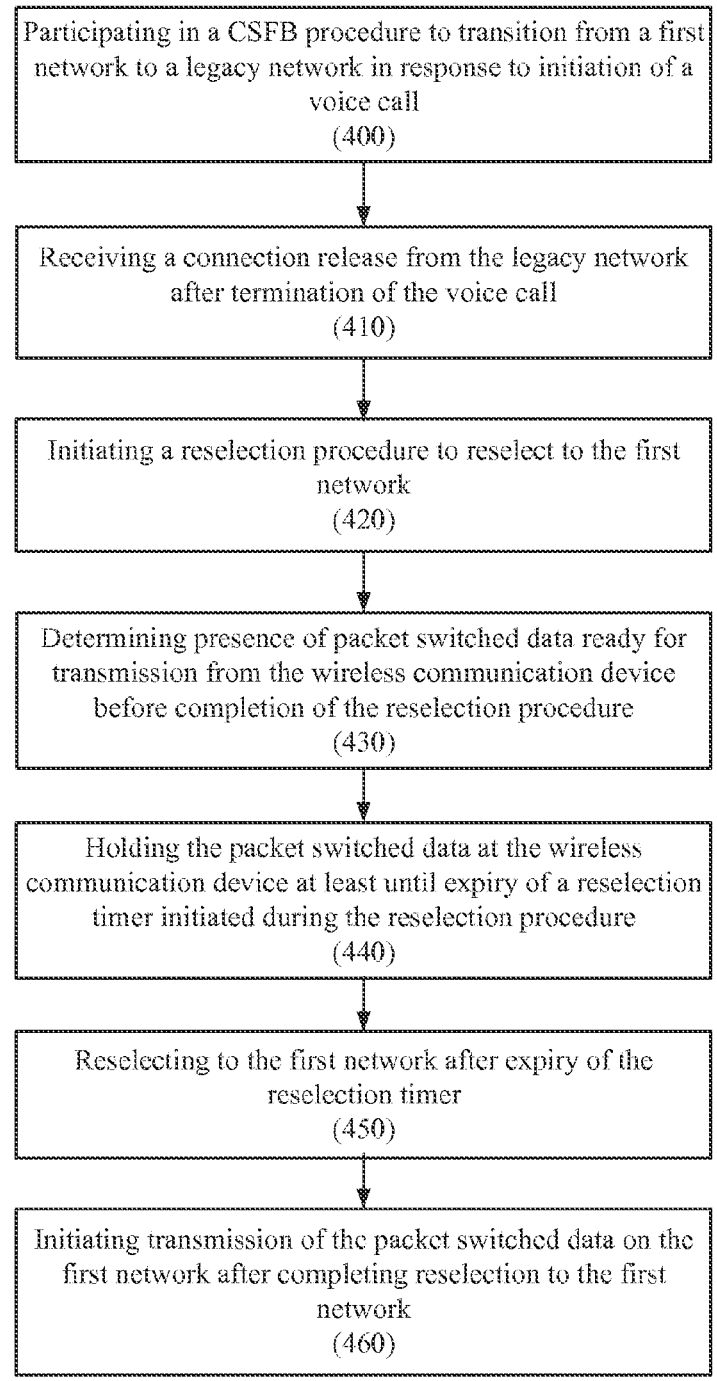
FIG. 4 illustrates a flowchart according to an example method for assisting return to a first network from a legacy network after performance of a CSFB procedure according to some example embodiments.

FIG. 4 illustrates a flowchart according to an example method for assisting return to the first network 204 from the legacy network 206 after performance of a CSFB procedure according to some example embodiments. In this regard, FIG. 4 illustrates operations that can be performed by the wireless communication device 202 in accordance with some example embodiments. One or more of processing circuitry 310, processor 312, memory 314, transceiver(s) 316, or selection control module 318 can, for example, provide means for performing the operations illustrated in and described with respect to FIG. 4. Operation 400 can include the wireless communication device 202 participating in a CSFB procedure to transition from the first network 204 to the legacy network 206 in response to initiation of a voice call. Operation 410 can include the wireless communication device 202 receiving a connection release from the legacy network 206 after termination of the voice call. After receiving the connection release, the wireless communication device 202 can be in an RRC state other than CELL_DCH, such as CELL_FACH, CELL_PCH, URA_PCH, idle state, or other state which can allow the wireless communication device 202 to reselect to the first network 204. Operation 420 can include the wireless communication device 202 initiating a reselection procedure to reselect to the first network 204.

Operation 430 can include determining presence of packet switched data ready for transmission from the wireless communication device 202 before completion of the reselection procedure. By way of non-limiting example, operation 430 can include determining arrival at a cellular baseband layer of packet switched data from a higher layer. Operation 440 can include holding the packet switched data at the wireless communication device 202 at least until expiry of a reselection timer initiated during the reselection procedure. Operation 450 can include the wireless communication device 202 reselecting to the first network 204 after expiry of the reselection timer. Operation 460 can include the wireless communication device 202 initiating transmission of the packet switched data on the first network 203 after completing reselection to the first network 204.

Figure 5:
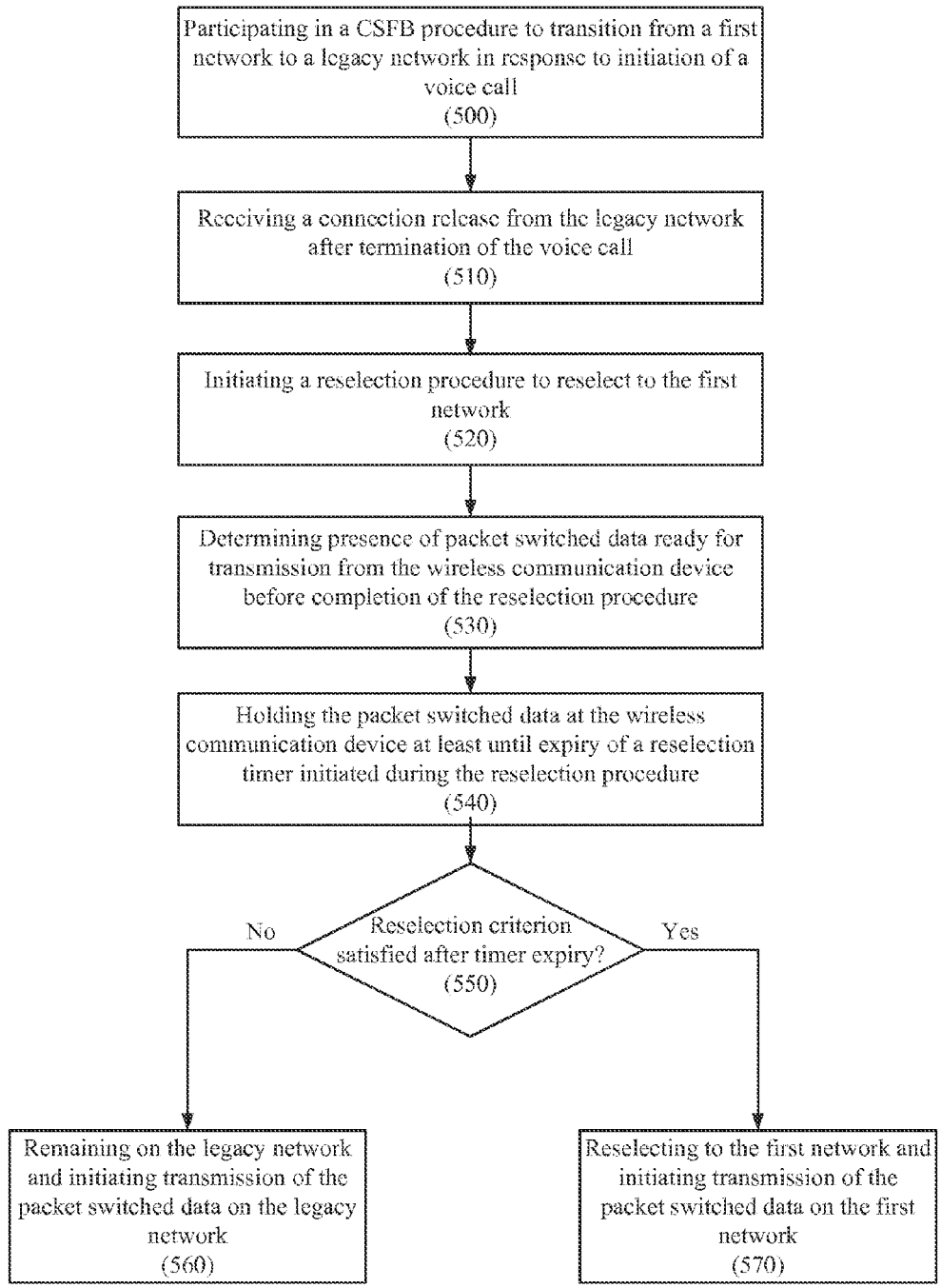
FIG. 5 illustrates a flowchart according to another example method for assisting return to a first network from a legacy network after performance of a CSFB procedure according to some example embodiments.

In some example embodiments, the reselection timer for which packet switched data can be held can be applied to allow for measurement and/or other evaluation of a target cell(s) of the first network 204 to evaluate whether reselection criteria is satisfied prior to reselecting to the first network 204. As such, in some example embodiments, if it is determined after expiry of the reselection timer that a reselection criterion is not satisfied, the reselection procedure can be aborted and transmission of held packet switched data can be initiated on the legacy network 206 rather than completing reselection to the first network 204 and initiating transmission of held packet switched data on the first network 204. If, however, applicable reselection criteria are satisfied, then the reselection to the first network 204 can be completed and transmission of held packet switched data can be initiated on the first network 204. FIG. 5 illustrates flowchart according to an example method for assisting return to the first network 204 from the legacy network 206 after performance of a CSFB procedure according to some such example embodiments. In this regard, FIG. 5 illustrates operations that can be performed by the wireless communication device 202 in accordance with some example embodiments. One or more of processing circuitry 310, processor 312, memory 314, transceiver(s) 316, or selection control module 318 can, for example, provide means for performing the operations illustrated in and described with respect to FIG. 5.

Operation 500 can include the wireless communication device 202 participating in a CSFB procedure to transition from the first network 204 to the legacy network 206 in response to initiation of a voice call. Operation 510 can include the wireless communication device 202 receiving a connection release from the legacy network 206 after termination of the voice call. After receiving the connection release, the wireless communication device 202 can be in an RRC state other than CELL_DCH, such as CELL_FACH, CELL_PCH, URA_PCH, idle state, or other state which can allow the wireless communication device 202 to reselect to the first network 204. Operation 520 can include the wireless communication device 202 initiating a reselection procedure to reselect to the first network 204.

Operation 530 can include determining presence of packet switched data ready for transmission from the wireless communication device 202 before completion of the reselection procedure. By way of non-limiting example, operation 530 can include determining arrival at a cellular baseband layer of packet switched data from a higher layer.

Operation 540 can include holding the packet switched data at the wireless communication device 202 at least until expiry of a reselection timer initiated during the reselection procedure. Operation 550 can include the wireless communication device 202 determining whether a reselection criterion is satisfied after expiry of the reselection timer. In some instances, the determination of whether the reselection criterion is satisfied can be based at least in part on a measurement and/or other evaluation of the first network 204 and/or a target cell thereof that can be performed during a period of the reselection timer. In an instance in which it is determined at operation 550 that the reselection criterion has not been satisfied, the method can proceed to operation 560, which can include the wireless communication device 202 remaining on the legacy network 206 and initiating transmission of the held packet switched data on the legacy network 206. If, however, it is determined at operation 550 that the reselection criterion has been satisfied, the method can instead proceed to operation 570, which can include the wireless communication device 202 reselecting to the first network 204 and initiating transmission of the held packet switched data on the first network 204.

It will be appreciated that, in some example embodiments, there can be further evaluation of the first network 204 and/or a target cell(s) thereof after performance of operation 550. As such, additional reselection criteria can be evaluated following performance of operation 550 in some such embodiments. In such embodiments, if a reselection criterion is not satisfied, the method can proceed to operation 560, rather than operation 570, even if the reselection criterion evaluated in operation 550 is satisfied. In this regard, some example embodiments can implement reselection procedures entailing evaluation of a series of reselection criteria. If any individual reselection criterion in the series is not met, then reselection to the first network 204 can be aborted, and transmission of the packet switched data can be initiated on the legacy network 206.

In accordance with various example embodiments, packet switched data can be held during a period of any reselection timer(s) that can be initiated during a reselection procedure. In this regard, a reselection procedure that can be used to reselect to the first network 204 can vary depending on a type of the first network 204 and/or a type of the legacy network 206. Different reselection procedures can use a variety of reselection timers. As such, it will be appreciated that packet switched data can be held for a period of any of one or more timers that can be applied in accordance with a reselection procedure.

In some example embodiments, packet switched data can be held at least until expiry of a timer that can be applied for determining whether a target cell of the first network 204 is better than the serving cell of the legacy network 206. In example embodiments in which the first network 204 implements an LTE technology, such timer can be a Treselection timer, which can be used to measure a target LTE cell to determine whether it is better than a serving cell of the legacy network 206. The measurement can, for example, be performed based on criteria that can be defined in a system information block (SIB), such as SIB 19. The wireless communication device 202 can, for example, determine whether the target cell of the first network 204 satisfies reselection criteria for Treselection seconds before reselecting to the first network 204.

Figure 6:
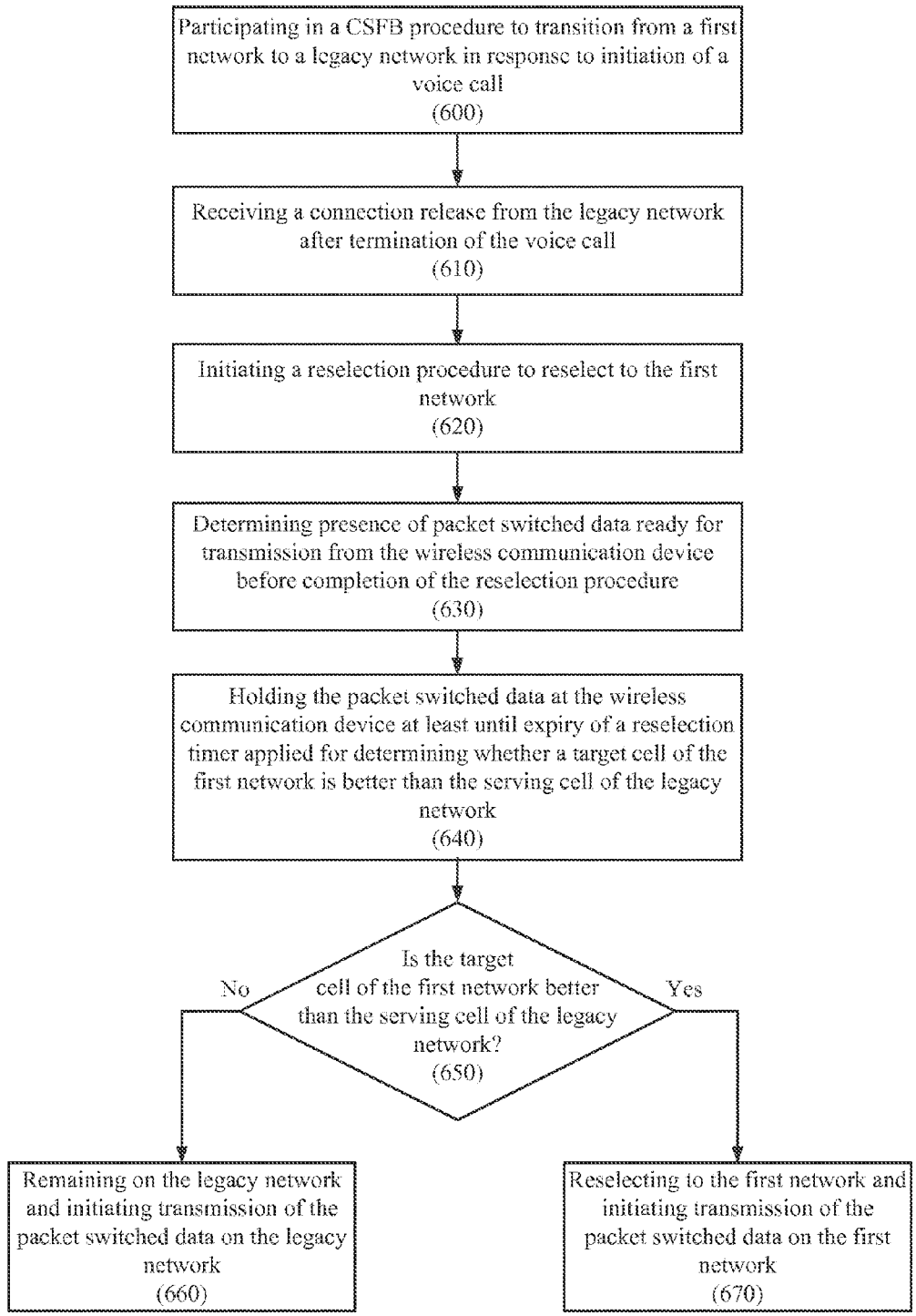
FIG. 6 illustrates a flowchart according to an example method for assisting return to a first network from a legacy network after performance of a CSFB procedure by holding packet switched data at least until expiry of a reselection timer applied for determining whether a target cell of the first network is better than the serving cell of the legacy network according to some example embodiments.

FIG. 6 illustrates a flowchart according to an example method for assisting return to the first network 204 from the legacy network 206 after performance of a CSFB procedure by holding packet switched data at least until expiry of a reselection timer applied for determining whether a target cell of the first network is better than the serving cell of the legacy network according to some example embodiments. In this regard, FIG. 6 illustrates operations that can be performed by the wireless communication device 202 in accordance with some example embodiments. One or more of processing circuitry 310, processor 312, memory 314, transceiver(s) 316, or selection control module 318 can, for example, provide means for performing the operations illustrated in and described with respect to FIG. 6. Operation 600 can include the wireless communication device 202 participating in a CSFB procedure to transition from the first network 204 to the legacy network 206 in response to initiation of a voice call. Operation 610 can include the wireless communication device 202 receiving a connection release from the legacy network 206 after termination of the voice call. After receiving the connection release, the wireless communication device 202 can be in an RRC state other than CELL_DCH, such as CELL_FACH, CELL_PCH, URA_PCH, idle state, or other state which can allow the wireless communication device 202 to reselect to the first network 204. Operation 620 can include the wireless communication device 202 initiating a reselection procedure to reselect to the first network 204.

Operation 630 can include determining presence of packet switched data ready for transmission from the wireless communication device 202 before completion of the reselection procedure. By way of non-limiting example, operation 630 can include determining arrival at a cellular baseband layer of packet switched data from a higher layer. Operation 640 can include holding the packet switched data at the wireless communication device 202 at least until expiry of a reselection timer that can be applied for determining whether a target cell of the first network 204 is better than the serving cell of the legacy network 206. Operation 650 can include the wireless communication device 202 determining whether the target cell of the first network 204 is better than the serving cell of the legacy network 206 after expiry of the reselection timer. Operation 650 can, for example, be performed based at least in part on a measurement of the target cell of the first network 204 that can be performed during a period of the reselection timer. In some example embodiments, operation 650 can include determining whether the target cell of the first network 204 satisfies a reselection criterion indicating that it is better than the serving cell of the legacy network 206 for a period of the reselection timer. In an instance in which it is determined at operation 650 that the target cell of the first network 204 is not better than the serving cell of the legacy network 206, the method can proceed to operation 660, which can include the wireless communication device 202 remaining on the legacy network 206 and initiating transmission of the held packet switched data on the legacy network 206. If, however, it is determined at operation 650 that the target cell of the first network 204 is better than the serving cell of the legacy network 206, the method can instead proceed to operation 670, which can include the wireless communication device 202 reselecting to the first network 204 and initiating transmission of the held packet switched data on the first network 204.

Figure 7:
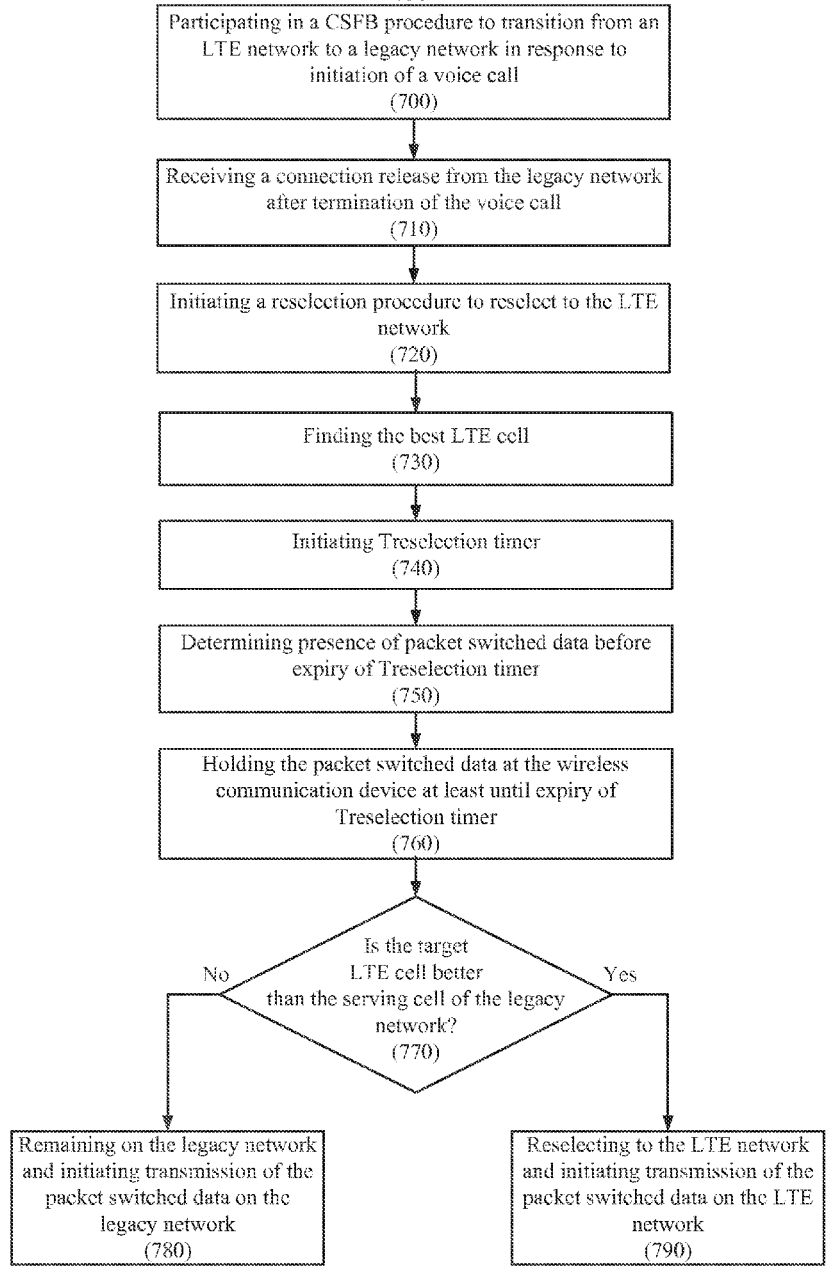
FIG. 7 illustrates a flowchart according to an example method for assisting return to an LTE network from a legacy network after performance of a CSFB procedure according to some example embodiments.

FIG. 7 illustrates a flowchart according to an example method for assisting return to an LTE network from a legacy network after performance of a CSFB procedure according to some example embodiments. In this regard, FIG. 7 illustrates an example embodiment of the method of FIG. 6 in which packet switched data can be held at least until expiration of a Treselection timer when reselecting to an LTE network. One or more of processing circuitry 310, processor 312, memory 314, transceiver(s) 316, or selection control module 318 can, for example, provide means for performing the operations illustrated in and described with respect to FIG. 7. Operation 700 can include the wireless communication device 202 participating in a CSFB procedure to transition from an LTE network to a legacy network in response to initiation of a voice call. Operation 710 can include the wireless communication device 202 receiving a connection release from the legacy network after termination of the voice call. After receiving the connection release, the wireless communication device 202 can be in an RRC state other than CELL_DCH, such as CELL_FACH, CELL_PCH, URA_PCH, idle state, or other state which can allow the wireless communication device 202 to reselect to the LTE network. Operation 720 can include the wireless communication device 202 initiating a reselection procedure to reselect to the LTE network.

Operation 730 can include the wireless communication device 202 finding a best LTE cell on the LTE network. The best LTE cell can be selected as a target LTE cell for reselection. Operation 740 can include the wireless communication device 202 initiating the Treselection timer. Operation 750 can include determining presence of packet switched data before expiry of Treselection timer. Operation 760 can include the wireless communication device 202 holding the packet switched data at the wireless communication device at least until expiry of Treselection timer. At operation 770, the wireless communication device 202 can determine whether the target LTE cell is better than the serving cell of the legacy network. Operation 770 can, for example, be performed based at least in part on a measurement of the target LTE cell of that can be performed during a period of the Treselection timer. In some example embodiments, operation 770 can include determining whether the target LTE cell satisfies a reselection criterion indicating that it is better than the serving cell of the legacy network for the period of the Treselection timer.

In an instance in which it is determined at operation 770 that the target LTE cell is not better than the serving cell of the legacy network, the method can proceed to operation 780, which can include the wireless communication device 202 remaining on the legacy network and initiating transmission of the held packet switched data on the legacy network. If, however, it is determined at operation 770 that the target LTE cell is better than the serving cell of the legacy network, the method can instead proceed to operation 790, which can include the wireless communication device 202 reselecting to the LTE network and initiating transmission of the held packet switched data on the LTE network.

As another example of a reselection timer for which packet switched data can be held, in some example embodiments, if packet switched data becomes ready for transmission before expiry of a reselection timer that can be applied to allow measurement of a detected cell of the first network 204, the packet switched data can be held at least until expiry of the reselection timer to allow the wireless communication device 202 to complete measurement of the detected cell of the first network 204. In example embodiments in which the first network 204 implements an LTE technology, such timer can be a $T_{measureE-UTRA}$ timer, which can provide a period for measuring a detected LTE cell(s) to determine if the detected LTE cell(s) satisfies an LTE reselection criterion.

Figure 8:
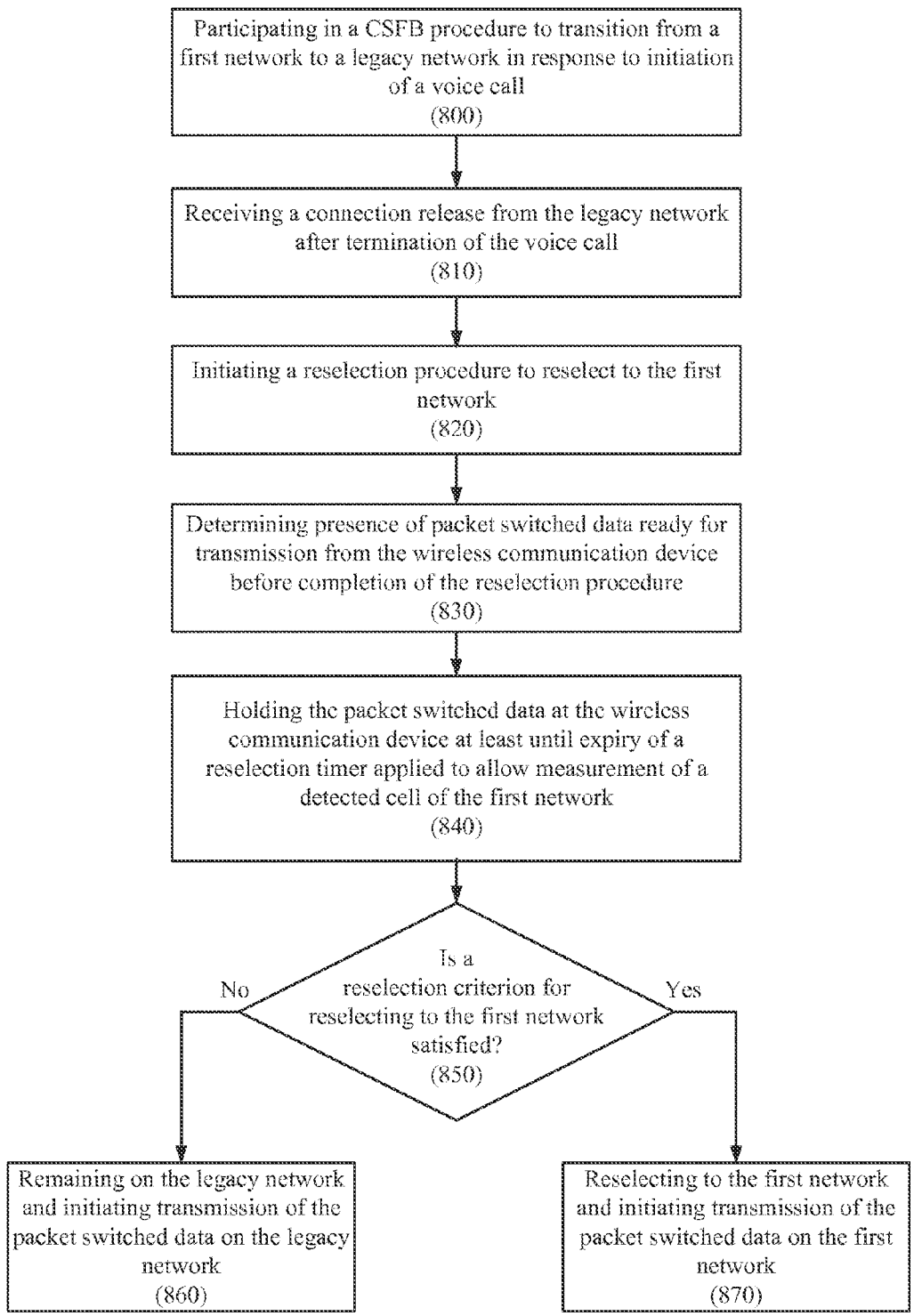
FIG. 8 illustrates a flowchart according to an example method for assisting return to a first network from a legacy network after performance of a CSFB procedure by holding packet switched data at least until expiry of a reselection timer applied to allow measurement of a detected cell of the first network according to some example embodiments.

FIG. 8 illustrates a flowchart according to an example method for assisting return to the first network 204 from the legacy network 206 after performance of a CSFB procedure by holding packet switched data at least until expiry of a reselection timer applied to allow measurement of a detected cell of the first network 204 according to some example embodiments. In this regard, FIG. 8 illustrates operations that can be performed by the wireless communication device 202 in accordance with some example embodiments. One or more of processing circuitry 310, processor 312, memory 314, transceiver(s) 316, or selection control module 318 can, for example, provide means for performing the operations illustrated in and described with respect to FIG. 8. Operation 800 can include the wireless communication device 202 participating in a CSFB procedure to transition from the first network 204 to the legacy network 206 in response to initiation of a voice call. Operation 810 can include the wireless communication device 202 receiving a connection release from the legacy network 206 after termination of the voice call. After receiving the connection release, the wireless communication device 202 can be in an RRC state other than CELL_DCH, such as CELL_FACH, CELL_PCH, URA_PCH, idle state, or other state which can allow the wireless communication device 202 to reselect to the first network 204. Operation 820 can include the wireless communication device 202 initiating a reselection procedure to reselect to the first network 204.

Operation 830 can include determining presence of packet switched data ready for transmission from the wireless communication device 202 before completion of the reselection procedure. By way of non-limiting example, operation 830 can include determining arrival at a cellular baseband layer of packet switched data from a higher layer. Operation 840 can include holding the packet switched data at the wireless communication device 202 at least until expiry of a reselection timer that can be applied to allow measurement of a detected cell of the first network 204. Operation 850 can include the wireless communication device 202 determining whether a reselection criterion for reselecting to the first network 204 is satisfied after expiry of the reselection timer. Operation 850 can, for example, be performed based at least in part on a measurement of the detected cell of the first network 204 that can be performed during a period of the reselection timer. In an instance in which it is determined at operation 850 that the reselection criterion is not satisfied, the method can proceed to operation 860, which can include the wireless communication device 202 remaining on the legacy network 206 and initiating transmission of the held packet switched data on the legacy network 206. If, however, it is determined at operation 850 that the reselection criterion is satisfied, the method can instead proceed to operation 870, which can include the wireless communication device 202 reselecting to the first network 204 and initiating transmission of the held packet switched data on the first network 204.

Figure 9:
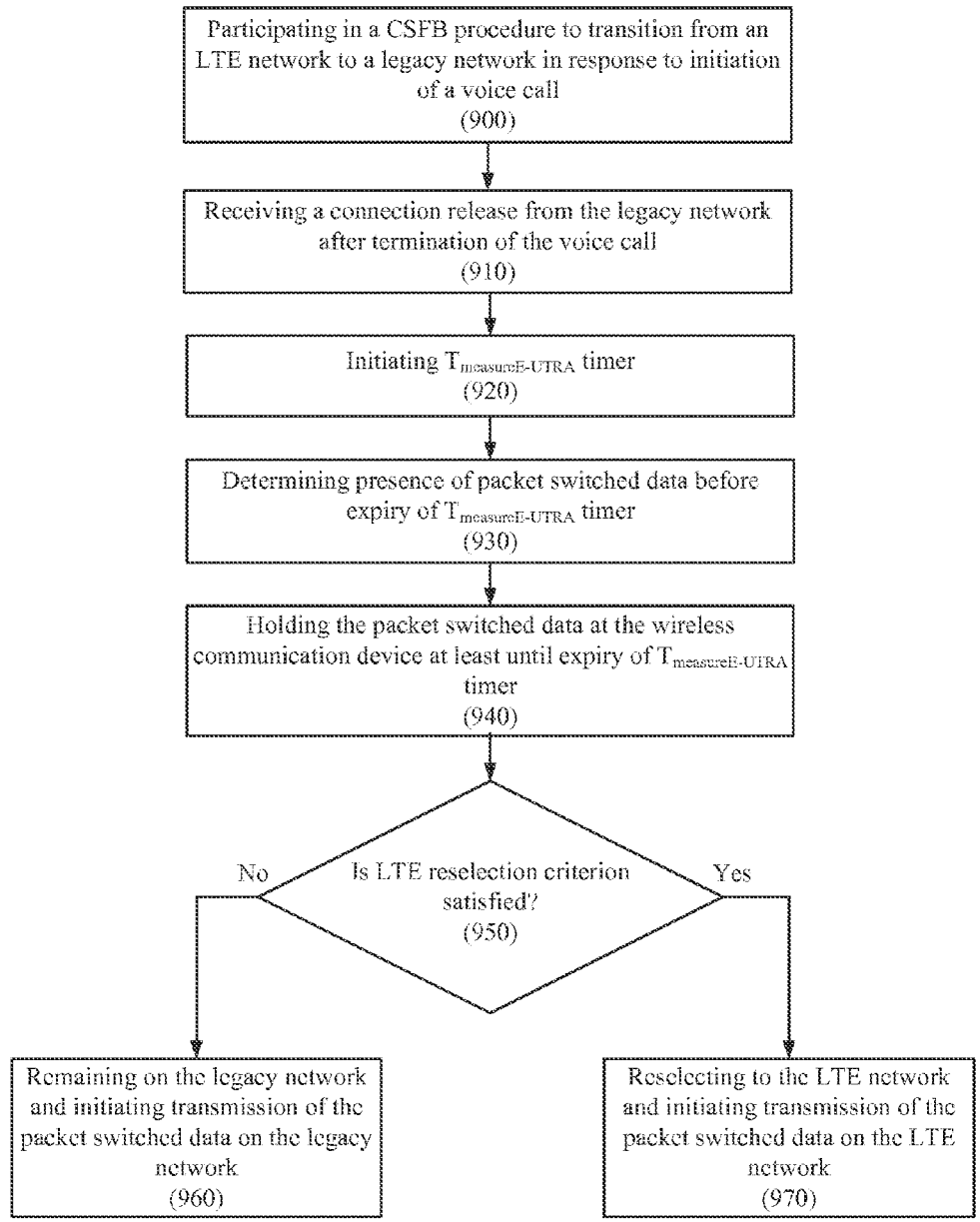
FIG. 9 illustrates a flowchart according to an example method for assisting return to an LTE network from a legacy network after performance of a CSFB procedure according to some example embodiments.

FIG. 9 illustrates a flowchart according to an example method for assisting return to an LTE network from a legacy network after performance of a CSFB procedure according to some example embodiments. In this regard, FIG. 9 illustrates an example embodiment of the method of FIG. 9 in which packet switched data can be held at least until expiration of a $T_{measureE-UTRA}$ timer when reselecting to an LTE network. One or more of processing circuitry 310, processor 312, memory 314, transceiver(s) 316, or selection control module 318 can, for example, provide means for performing the operations illustrated in and described with respect to FIG. 9. Operation 900 can include the wireless communication device 202 participating in a CSFB procedure to transition from an LTE network to a legacy network in response to initiation of a voice call. Operation 910 can include the wireless communication device 202 receiving a connection release from the legacy network after termination of the voice call. After receiving the connection release, the wireless communication device 202 can be in an RRC state other than CELL_DCH, such as CELL_FACH, CELL_PCH, URA_PCH, idle state, or other state which can allow the wireless communication device 202 to reselect to the LTE network.

Operation 920 can include the wireless communication device 202 initiating the $T_{measureE-UTRA}$ timer, which can be used to measure one or more LTE cells. Operation 920 can, for example, be performed attendant to performance of a reselection procedure for reselecting to the LTE network. Operation 930 can include determining presence of packet switched data before expiry of $T_{measureE-UTRA}$ timer. Operation 940 can include the wireless communication device 202 holding the packet switched data at the wireless communication device at least until expiry of $T_{measureE-UTRA}$ timer. At operation 950, the wireless communication device 202 can determine whether an LTE reselection criterion is satisfied. Operation 950 can, for example, be performed based at least in part on a measurement of a detected LTE cell of that can be performed during the period of the $T_{measureE-UTRA}$ timer.

In an instance in which it is determined at operation 950 that the LTE reselection criterion is not satisfied, the method can proceed to operation 960, which can include the wireless communication device 202 remaining on the legacy network and initiating transmission of the held packet switched data on the legacy network. If, however, it is determined at operation 950 that the reselection criterion is satisfied, the method can instead proceed to operation 970, which can include the wireless communication device 202 reselecting to the LTE network and initiating transmission of the held packet switched data on the LTE network.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for assisting a wireless communication device to return to a Long Term Evolution (LTE) network from a legacy network, the method comprising:

by the wireless communication device:
receiving a connection release from the legacy network after termination of a voice connection;
initiating a reselection procedure to reselect to the LTE network in response to the connection release;
holding pending uplink packet switched data, detected by the wireless communication device after initiating the reselection procedure, at least until expiry of a reselection timer initiated during the reselection procedure;
reselecting to the LTE network after expiry of the reselection timer; and
initiating transmission of the pending uplink packet switched data via the LTE network after reselecting to the LTE network.

2. The method of claim 1, further comprising:
by the wireless communication device:
determining whether a reselection criterion is satisfied after expiry of the reselection timer;
wherein the reselecting to the LTE network and the initiating transmission of the pending uplink packet switched data via the LTE network are performed when the reselection criterion is satisfied; and
wherein the method further comprises initiating transmission of the pending uplink packet switched data via the legacy network when the reselection criterion is not satisfied.

3. The method of claim 1, wherein the reselection timer comprises a reselection timer applied for determining whether a target LTE cell is better than a serving cell of the legacy network.

4. The method of claim 3, further comprising:
by the wireless communication device:
determining, after expiry of the reselection timer, whether the target LTE cell is better than the serving cell of the legacy network;
wherein the reselecting to the LTE network and the initiating transmission of the pending uplink packet switched data via the LTE network are performed when the target LTE cell is better than the serving cell of the legacy network; and
wherein the method further comprises initiating transmission of the pending uplink packet switched data via the legacy network when the target LTE cell is not better than the serving cell of the legacy network.

5. The method of claim 1, wherein the reselection timer comprises a reselection timer applied to allow the wireless communication device to measure a detected LTE cell.

6. The method of claim 5, further comprising:
determining, after expiry of the reselection timer, whether an LTE reselection criterion is satisfied based at least in part on measurement of the detected LTE cell;
wherein the reselecting to the LTE network and the initiating transmission of the pending uplink packet switched data via the LTE network are performed when the LTE reselection criterion is satisfied; and
wherein the method further comprises initiating transmission of the pending packet switched data via the legacy network when the LTE reselection criterion is not satisfied.

7. The method of claim 1, further comprising:
by the wireless communication device:
determining presence of the pending uplink packet switched data at a baseband layer.

8. The method of claim 1, wherein the wireless communication device is in a radio resource control (RRC) state other than a cell dedicated channel (CELL_DCH) state when the reselection procedure is initiated.

9. A method for assisting a wireless communication device to return to a first network from a second network, the method comprising:
by the wireless communication device:
receiving a connection release from the second network after termination of a voice connection;
initiating a reselection procedure to reselect to the first network after receipt of the connection release from the second network;
holding pending uplink packet switched data, detected after initiating the reselection procedure, at least until expiry of a reselection timer initiated during the reselection procedure;
reselecting to the first network after expiry of the reselection timer; and
initiating transmission of the pending uplink packet switched data via the first network after reselecting to the first network.

10. The method of claim 9, further comprising:
by the wireless communication device:
determining whether a reselection criterion is satisfied after expiry of the reselection timer;
wherein the reselecting to the first network and the initiating transmission of the pending uplink packet switched data via the first network are performed when the reselection criterion is satisfied; and
wherein the method further comprises initiating transmission of the pending uplink packet switched data via the second network when the reselection criterion is not satisfied.

11. The method of claim 9, wherein the first network comprises a network using a Long Term Evolution (LTE) technology, and wherein the voice connection is handled by a circuit switched domain of the second network.

12. A wireless communication device comprising:
at least one transceiver configurable to communicate with a first network and a second network; and
processing circuitry coupled to the at least one transceiver and configured to control the wireless communication device to:
receive a connection release from the second network after termination of a voice connection;
initiate a reselection procedure to reselect to the first network after receipt of the connection release;
hold pending uplink packet switched data, detected by the wireless communication device after initiating the reselection procedure, at least until expiry of a reselection timer initiated during the reselection procedure;
reselect to the first network after expiry of the reselection timer; and
initiate transmission of the pending uplink packet switched data via the first network after reselecting to the first network.

13. The wireless communication device of claim 12, wherein the processing circuitry is further configured to control the wireless communication device to:
determine whether a reselection criterion is satisfied after expiry of the reselection timer;
reselect to the first network and initiate transmission of the pending uplink packet switched data on the first network when the reselection criterion is satisfied; and
initiate transmission of the pending uplink packet switched data on the second network when the reselection criterion is not satisfied.

14. The wireless communication device of claim 12, wherein the reselection timer comprises a reselection timer applied for determining whether a target cell of the first network is better than a serving cell of the second network.

15. The wireless communication device of claim 14, wherein the processing circuitry is further configured to control the wireless communication device to:
determine, after expiry of the reselection timer, whether the target cell of the first network is better than the serving cell of the second network;
reselect to the first network and initiate transmission of the pending uplink packet switched data via the first network when the target cell of the first network is better than the serving cell of the second network; and
initiate transmission of the pending uplink packet switched data via the second network when the target cell of the first network is not better than the serving cell of the second network.

16. The wireless communication device of claim 12, wherein the reselection timer comprises a reselection timer applied to allow the wireless communication device to measure a detected cell of the first network.

17. The wireless communication device of claim 16, wherein the processing circuitry is further configured to control the wireless communication device to:
determine, after expiry of the reselection timer, whether a reselection criterion for reselecting to the first network is satisfied based at least in part on a measurement of the detected cell of the first network;
reselect to the first network and initiate transmission of the pending uplink packet switched data on the first network when the reselection criterion is satisfied; and
initiate transmission of the pending uplink packet switched data on the second network when the reselection criterion is not satisfied.

18. The wireless communication device of claim 12, wherein the processing circuitry is further configured to determine presence of pending uplink packet switched data at a baseband layer.

19. The wireless communication device of claim 12, wherein the wireless communication device is in a cell forward access channel (CELL_FACH) state, a cell paging channel (CELL_PCH) state, a Universal Terrestrial Access Network (UTRA) registration area paging channel (URA_PCH) state, or an idle state when the reselection procedure is initiated.

20. The wireless communication device of claim 12, wherein the first network comprises a network using a Long Term Evolution (LTE) technology, and wherein the voice connection is handled by a circuit switched domain of the second network.

* * * * *